United States Patent [19]

Kilgren et al.

[11] 4,066,424
[45] Jan. 3, 1978

[54] SELECTIVELY RECOVERING METAL CHLORIDES FROM GASEOUS EFFLUENT

[75] Inventors: Arnold William Kilgren; David Nicholson Low; Robert Warwick Porter, all of Wilmington, Del.

[73] Assignee: E. I. Du Pont de Nemours and Company, Wilmington, Del.

[21] Appl. No.: 732,284

[22] Filed: Oct. 13, 1976

[51] Int. Cl.² .......................... B01D 7/02; C01G 9/02
[52] U.S. Cl. .......................................... 55/71; 55/72; 55/82; 423/491; 423/492; 423/497; 423/493; 423/494; 423/495; 423/79
[58] Field of Search .................. 62/10; 23/294; 55/82, 55/71, 72; 423/491, 492, 493, 494, 495, 497, 79, 149

[56] References Cited

U.S. PATENT DOCUMENTS

| | | | |
|---|---|---|---|
| 2,446,181 | 8/1948 | Kraus | 55/72 |
| 2,580,635 | 1/1952 | Winter | 23/294 |
| 2,999,733 | 9/1961 | Groves | 423/79 |
| 3,222,847 | 12/1965 | Secord et al. | 55/71 |
| 3,878,291 | 4/1975 | Keller et al. | 423/493 |

FOREIGN PATENT DOCUMENTS 598,741   5/1960   Canada .................. 23/294

*Primary Examiner*—O. R. Vertiz
*Assistant Examiner*—Brian E. Hearn

[57] ABSTRACT

Process for selectively recovering metal chlorides from a gaseous mixture of metal chlorides by contacting the gaseous mixture at a temperature above the condensation point of the mixture with at least one stream of liquid to cool all the mixture to below the freezing point of at least one metal chloride in the mixture, the average velocity of the mixture being at least the pneumatic conveyance volicity at the point of contact. This process provides for recovery of metal chlorides without plugging the apparatus.

7 Claims, 1 Drawing Figure

SELECTIVELY RECOVERING METAL CHLORIDES FROM GASEOUS EFFLUENT

BACKGROUND OF THE INVENTION

This invention is directed to a method for recovering metal chlorides from a gaseous mixture. More particularly this invention is directed to an improved method for recovering the metal chlorides selectively and without plugging the apparatus in which the metal chlorides are formed, transferred, or condensed.

A common method practiced in the art for separating the metal components of a metaliferous material involves chlorination of the metaliferous material at a temperature sufficiently high to vaporize the major metal chlorides so produced. The gaseous mixture which results is then cooled by a variety of methods to either sequentially or simultaneously condense one or more of the metal chlorides to the solid state while leaving the remaining metal chloride or chlorides in the gaseous state. In this manner it is possible to isolate the desired metal chloride and, if necessary, separately subject it to further processing dictated by the end use requirements.

How efficiently the cooling method effects separation of a particular metal chloride from a gaseous mixture of metal chlorides depends primarily on the particular condensation characteristics of the metal chloride to be separated. Cooling efficiency is particularly critical when the gaseous mixture of metal chlorides contains at least one metal chloride having a wide liquid temperature range, i.e., a wide range of temperature at which the metal chloride is in the liquid state, and a sufficiently high freezing point to allow the formation of solid on the colder surfaces of the apparatus. When gaseous metal chlorides having these characteristics are cooled in the conventional manner, e.g., in spray condensers or by transport through the apparatus, they remain in the liquid state sufficiently long prior to solidification that the liquid droplets coalesce on the apparatus surface and form solid masses. Furthermore, if solid particles are present in the gaseous mixture the coalescing droplets can entrap the particles in the freezing process. The solid masses cannot be pneumatically transported by the gaseous mixture and will eventually plug the apparatus.

For example, when ferrotitaniferous materials are chlorinated, the major chlorides in the resulting gaseous mixture are titanium tetrachloride, ferric chloride, and ferrous chlorides. In practice, the chlorination is conducted at a temperature of about 900°–1100° C. and in that temperature range certain minor metal chlorides such as calcium and magnesium chlorides remain as liquids in the chlorination bed. The minor metal chlorides usually amount to no more than 2% by weight of the ferrotitaniferous material and do not form part of the gaseous mixture leaving the chlorinator. Of the major metal chlorides in the gaseous mixture, it is ferrous chloride which has a wide liquid temperature range, i.e., from 650° to 850° C. and relatively high freezing point, i.e., about 600° C. Consequently, as the gaseous mixture exits the high temperature chlorinator and experiences heat loss, ferrous chloride can begin to liquify at as high a temperature as 850° C. and will remain in the liquid state long enough so that the liquid droplets coalesce and fall on the apparatus surfaces which are below 600° C. where the coalesced liquid freezes. In contrast the ferric chloride component has a very narrow liquid temperature range and will condense to a particulate solid, or "snow out," from the gaseous mixture of a temperature from 200° to 300° C. The particulate solid ferric chloride can be pneumatically transported through the processing apparatus by the gaseous mixture and separated therefrom if desired. The titanium tetrachloride component of the gaseous mixture begins to condense to a liquid at a temperature of less than about 160° C. depending on pressure, but does not freeze until a temperature of less than about −20° C. is reached. Consequently, even if temperatures of less than 160° C. are reached in the apparatus or on the surfaces of the apparatus, most of the titanium tetrachloride liquid can be pneumatically transported throughout the apparatus and the formation of solid titanium tetrachloride does not occur.

One of the earliest attempts to eliminate ferrous chloride pluggage, described in Groves U.S. Pat. No. 2,999,733 involves chlorinating a material in a reactor at a temperature above 800° C. wherein the temperature of a portion of the vapor space above the chlorination bed is maintained below the temperature at which ferrous chloride is solid. The temperature of the vapor space can be maintained for example by spraying liquid coolant into the vapor space above the chlorination bed in the reaction chamber. A major drawback of this method in practic is the difficulty in maintaining the chlorination bed at the high temperature necessary for the chlorination reaction to take place, i.e., at least 800° C. In addition, a tremendous quantity of heat must be supplied to the chlorinator to maintain reaction temperature resulting in prohibitive energy costs.

A later attempt to eliminate ferrous chloride pluggage is described in Cairns et al. U.S. Pat. No. 3,261,664. This method involves cooling a gaseous mixture of titanium tetrachloride, ferric chloride, and ferrous chloride to a temperature from 500° to 550° C. by, for example, injection liquid coolant, particularly titanium tetrachloride, into the flue cooler into which the gaseous mixture is passed after reaction where liquid can accumulate in the flues.

A relatively recent method for separating titanium tetrachloride from ferric and ferrous chloride, described in Uhland U.S. Pat. No. 3,628,913, involves transferring the gaseous mixture through a duct at a temperature of at least 20° C. above the dew point of ferrous chloride to a spray condenser where the gaseous mixture is cooled to between 150° to 280° C. with liquid titanium tetrachloride. While this method avoids severe ferrous chloride pluggage in the transfer duct, the cooling requires large condensation chamber equipped with a spray disk of sufficient size to atomize large quantities of liquid titanium tetrachloride.

This invention is based primarily on the discovery that gaseous metal chloride, particularly one with a wide liquid temperature range and high freezing point, must be rapidly and thoroughly cooled to a temperature below the freezing point to avoid the formation of liquid phase droplets which can coalesce and form massive solid deposits.

SUMMARY OF THE INVENTION

This invention is directed to an improved process for recovering metal chlorides from a gaseous mixture consisting essentially of at least two gaseous metal chlorides. The improvement resides in contacting gaseous mixture at a temperature above the condensation point of the gaseous mixture, preferably at least 5° C. above the condensation point, with at least one stream of liquid, preferably in the form of a high velocity stream of liquid, to rapidly cool substantially all of the gaseous mixture to a temperature below the freezing point of at least one metal chloride in the gaseous mixture, the velocity of the gaseous mixture being at least the pneumatic conveyance velocity at the contact zone and the rate of cooling substantially all of the gaseous mixture being less than one second, preferably less than 0.5 second. It is preferred for rapid cooling that at least one stream of liquid be directed countercurrently to the direction of flow of the gaseous mixture. To further insure rapid cooling, it is preferred that the velocity of liquid from the stream is sufficient to provide at least 1.0 jet horsepower per square foot of cross-sectional area of the contact zone and that the velocity of the gaseous mixture be at least the flooding velocity at the point of contact.

DETAILED DESCRIPTION OF THE INVENTION

Figure 1:
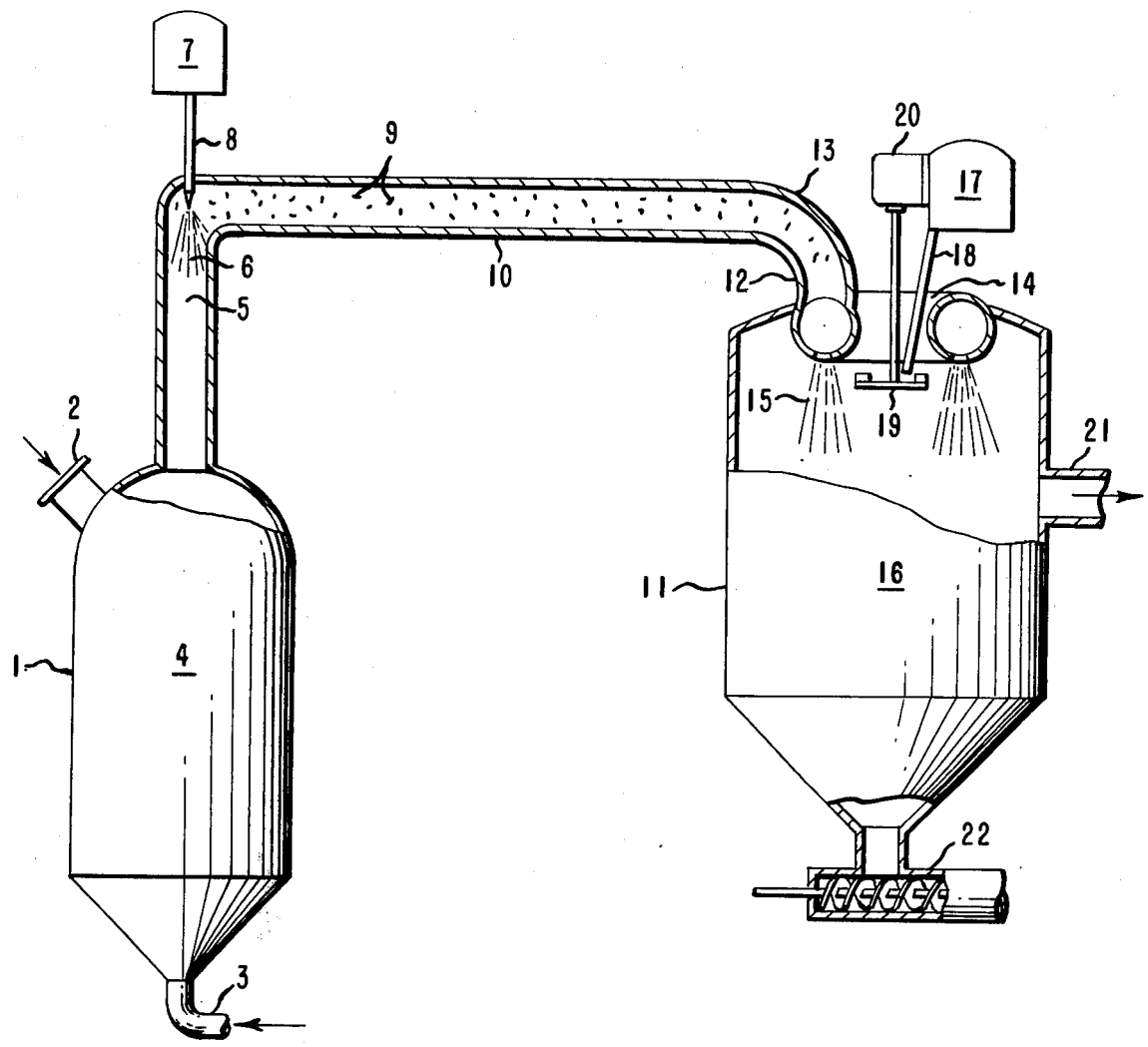
FIG. 1 is a schematic drawing of a vertical section view of one type of apparatus that can be used in practicing the invention.

The composition or source of the gaseous mixture of metal chlorides useful in the practice of the invention is not critical so long as the temperature and velocity of the mixture are controlled in accordance with the invention. A common industrial source of gaseous mixtures of metal chlorides results from the chlorination of metaliferous materials in order to recover, preferably separately, the metal components of the metaliferous materials for a variety of end uses. Depending primarily on the chlorination temperature and the properites of the metal chlorides produced, the resulting gaseous mixture can contain the major metal chlorides in the gaseous state, as in the chlorination of ferrotitaniferous materials, or can contain the minor metal chlorides, as in the chlorination of copperiferous materials where the copper chlorides remain in the chlorination bed as liquids. In any event, the chlorination of metaliferous materials results in the formation of a gaseous mixture containing at least one, and usually several, metal chlorides.

The metaliferous materials which can form mixtures of gaseous metal chlorides include all ores or materials derived from an ore source which contain at least two metals and which are capable of chlorination. The metal components of the material can be present as the free metal or chemically bound to nonmetal components of the material, e.g., as oxides, sulfides, etc. The primary criterion for the material is that the metallic components thereof, however bound, undergo reaction with a chlorinating agent, e.g., molecular chlorine to form a mixture of gaseous metal chlorides which can be separated or recovered in accordance with the invention. Common metal components of metaliferous materials capable of chlorination include titanium, iron, copper, lead, zinc, cobalt, calcium, chromium, nickel, tin, aluminum, vanadium, manganese, and magnesium. Metaliferous materials such as ores often contain other elements such as phosphorous, sulfur and silicon which may also form chlorides under the conditions of the chlorination. These metal chlorides are usually present in minor amounts, e.g., less than 2% by weight, in ferrotitaniferous materials, and are not recovered by condensation.

The temperature at which chlorination of the metaliferous material is conducted can be calculated from thermodynamic considerations or determined experimentally by raising the temperature until chlorination takes place. In general, the chlorination temperature of a metaliferous material is at least as high as the boiling point or sublimation point, whichever applies, of the highest boiling or subliming metal chloride to be produced in the gaseous state. For example, in the case where the metaliferous material is ferrotitaniferous, i.e., containing titanium and iron as major metallic components, the chlorination temperature is at least 900° C. and the chlorides of titanium and iron are gaseous. Consequently, the temperature of the mixture of gaseous metal chlorides so produced is at least 50° C. and often at least 200° C. above the condensation point of the gaseous mixture to insure a totally gas phase complete chlorination.

No matter what the chlorination temperature of the metaliferous material, a critical feature of this invention is that after leaving the chlorinator and prior to cooling, the temperature of the gaseous mixture, commonly called effluent, be above the condensation point of the gaseous mixture, preferably at least 5° C. above the condensation point. The comdensation point as used herein is intended to mean the temperature at which one or more of the gaseous chlorides in the gaseous mixture begins to condense to a liquid or, in the case where no liquid phase exists, to a solid. Since the condensation point of a gaseous mixture depends primarily upon the composition of the mixture, in a case where the composition can be carefully controlled the mixture can be held to as little as 5° C. above the condensation point to insure that the metal chlorides are substantially all in the gas phase prior to cooling. However, in the industrial chlorination of metaliferous materials where the composition of the gaseous mixture can vary somewhat as chlorination proceeds, it is recommended that the temperature of the gaseous mixture be maintained at least 20° C. above the condensation point to insure that the metal chlorides of the mixture are substantially all in the gas phase prior to cooling.

The maximum advantages of the invention are realized when the gaseous mixture contains at least one metal chloride having a wide liquid temperature range, for example, at least 100° C., and a relatively high freezing point, i.e., the temperature at which the liquid begins to solidify. For example, if a liquefied metal chloride has a freezing point at least 50° C. above the temperature of the apparatus walls, it can solidify on the surfaces of the apparatus through which it is transported and eventually cause severe pluggage. A typical example of a metal chloride having these characteristics is ferrous chloride, discussed hereinabove. To prevent pluggage of the processing apparatus it is essential that the gaseous mixture be rapidly and substantially totally cooled to below the freezing point of at least one metal chloride in the gaseous mixture, preferably the chloride having the wide liquid temperature range so that the troublesome liquid phase is passed so rapidly, preferably in less than one second, that substantially no condensation of liquid and subsequent freezing on the apparatus occurs. It should be understood that "substantially no condensation" of liquid which freezes on the apparatus means that while a small amount of solid may form on the apparatus surfaces, the amount of solid is insufficient to cause pluggage during extended operations.

In accordance with this invention cooling of the gaseous mixture is accomplished by contacting the gaseous mixture with at least one stream of liquid coolant. The liquid coolant should be a substance which is liquid well below the temperature to which it is desired to cool the gaseous mixture, for example, ambient temperature, and which is substantially inert to the metal chlorides and easily separated therefrom. A liquid form of the metal chloride in the gaseous mixture to be cooled having the lowest condensation point is a convenient and preferred choice because upon cooling the gaseous mixture to condense a higher condensing metal chloride component, the liquid metal chloride coolant is vaporized and can be later isolated with the same metal chloride originally present in the gaseous mixture. For example, liquid titanium tetrachloride is recommended to cool the gaseous mixture from the chlorination of ferrotitaniferous materials. Other liquids such as carbon tetrachloride, methylene chloride, chlorine or mixtures thereof may also be used.

To effect rapid and complete cooling of the gaseous mixture the liquid coolant should be in the form of a high velocity stream of liquid, preferably having a velocity sufficient to provide greater than 1.0 jet horsepower per square foot of cross-sectional area of the contact zone. The jet horsepower per square foot, i.e., jet HP/ft.$^2$, can be calculated from the relationship $$\text{jet HP/ft.}^2 = [\text{lbs./sec.} \cdot (V^2/2\ g.)]/550A$$

where
lbs./sec. = liquid rate from jet
$V$ = jet velocity in ft./sec.
$g.$ = 32.2 ft./sec.$^2$
$A$ = duct cross-sectional area in ft.$^2$ The high velocity stream of liquid should preferably be in the form of a cone. While angle of the cone is not particularly critical for the general practice of the invention, it is preferred that the angle of the cone be less than 25° to provide most effective mixing of the coolant. In practice, a gaseous mixture of metal chlorides is generally conveyed from the chlorinator via a transfer duct which can have a wide variety of configurations. When the transfer duct is a relatively narrow pipe the angle of the cone should be minimized.

A wide variety of liquid delivery apparatus, such as nozzles or other tubular devices having a restricted orifice at one end, can be utilized to produce a high velocity stream of liquid. A particularly suitable apparatus, described in U.S. Pat. No. 3,803,805, comprises a tube equipped at the inlet end with a supply of liquid which is pumped through the tube through a restricted orifice at the outlet end designed to disperse the liquid in a 20° wide cone. The stream of liquid so dispersed is not to be confused with showers of liquid dispersed via conventional low velocity spray nozzles.

While the direction of flow of the stream of liquid can be at any angle relative to the direction of flow of the gaseous mixture, it is preferred for most efficient cooling that the direction of flow of the stream of liquid be countercurrent relative to the direction of flow of the gaseous mixture. Under conditions of countercurrent flow maximum turbulence, i.e., mixing the gas and liquid, are realized. Furthermore, the better distribution of the liquid in the gaseous mixture promotes evenly distributed rapid cooling and complete evaporation of the liquid coolant on the order of less than a second after contact is made. Cocurrent flow of the stream of liquid provides satisfactory cooling, but may require somewhat longer contact time to insure complete evaporation of the liquid coolant.

It is also critical to the practice of this invention that the average velocity of the effluent in the contact zone at the point of contact with the stream of liquid be at least the pneumatic conveyance velocity. The pneumatic conveyance velocity is the gas velocity at which liquid droplets and particulate materials remain suspended in the gas stream and are thus carried along in the direction of the gas flow. When the direction of the high velocity stream of liquid coolant is countercurrent to the direction of flow of the gaseous mixture the velocity of the gaseous mixture should be at least the flooding velocity. It will be understood that the term "flooding velocity" as used herein refers to the well-known phenomenon which occurs when the gas velocity is sufficient to hold up liquid in an open pipe, e.g., see U.S. Pat. No. 3,350,075. Such flooding velocities will typically occur at gas velocities on the order of about 1,000 to 2,000 feet per minute but the actual value can depend upon the particular gases and liquids involved.

When the gaseous mixture of metal chlorides is produced by chlorinating a metaliferous material, the cooling in accordance with the invention must be conducted outside the chlorinator or reaction zone. In other words the point at which the high velocity stream of liquid coolant is contacted with the gaseous mixture, i.e., the contact zone, must be removed from the reaction zone to avoid lowering the temperature of the chlorination reaction.

The temperature to which the gaseous mixture is cooled in accordance with this invention depends on the thermal characteristics, e.g., condensation point, liquid temperature range, and freezing point, of the various metal chlorides in the gaseous mixture and whether it is desired to separate each metal chloride alone or two or more together. If the effluent contains a mixture of metal chlorides whose freezing points are sufficiently far apart, e.g., at least 5° C., and preferably at least 20° C., and for metal chlorides having a liquid phase, whose liquid temperature ranges do not overlap, each metal chloride can be separately condensed to a particulate solid from the gaseous mixture by first cooling the gaseous mixture to a temperature below the freezing point of the highest boiling metal chloride in the gaseous mixture, preferably at least 5° C. below that freezing point while remaining at least 5° C. above the freezing point of the next highest boiling metal chloride in the gaseous mixture. In this manner the highest boiling is condensed to a particulate solid, i.e., "snowed-out," and can be removed from the gaseous mixture, if desired, by means of a cyclone or other conventional solids/gas separation devices, prior to removal of the next highest boiling metal chloride. If the liquid temperature ranges or freezing points of certain metal chlorides in the gaseous mixture overlap or if it is desired to remove a group of metal chlorides in one cooling, the gaseous mixture should be cooled to a temperature below the freezing point of the lowest boiling metal chloride of the group to be snowed-out. In this manner two or more metal chlorides can be snowed-out together.

In the case of gaseous mixture consisting essentially of titanium tetrachloride, ferric chloride and ferrous chloride, it is essential that the temperature of the gaseous mixture be above the ferrous chloride condensation point, preferably at least 20° C. above the condensation point, prior to cooling. Ferrous chloride has by far the highest condensation point of major components of the mix and the widest liquid temperature range. The condensation point of ferrous chloride varies with the composition of the gaseous mixture, particularly with respect to the mole percent of ferrous chloride relative to the total moles of ferrous chloride and ferric chloride present. Furthermore, diluting the gaseous mixture with an inert gas or titanium tetrachloride has the effect of lowering the condensation point of ferrous chloride. Diluents may be useful for temperature control. Carbon dioxide, carbon monoxide, and nitrogen are diluents commonly found in the gaseous mixture which is formed from the vapor phase chlorination of a ferrotitaniferous material. These diluents are products of reacting a carbonaceous fuel in the chlorination furnace to obtain the high temperatures and reducing atmosphere necessary for this process. In actual operation, the condensation point of ferrous chloride ranges from approximately 700° to 900° C. For example, a typical operation utilizing ilmenite with 30% by weight of iron oxide will produce a ferrous chloride condensation point of approximately 800° to 850° C. It is preferred that the gaseous mixture be rapidly and completely cooled in accordance with the invention to a temperature below 600° C. and more preferably below 500° C., but above 350° C. to insure the substantially complete snowing-out of the ferrous chloride in the form of fine particles which are easily pneumatically transported by the gaseous mixture. The ferric chloride can be snowed-out after removal of the particulate ferrous chloride by further cooling the gaseous mixture to a temperature between 175° and 250° C. utilizing a second liquid jet. If there is no need to separately recover the iron chlorides, the gaseous mixture can be immediately cooled in accordance with the invention to a temperature between about 175° and 250° C. to snow-out both ferrous and ferric chloride together and eliminate any need to further cool the gaseous mixture in conventional devices such as the spray condensers described in U.S. Pat. No. 3,628,913. However, if desired, after the snowing-out of ferrous chloride, the gaseous mixture with or without the particulate ferrous chloride can be further cooled by conventional spray condensers, because the ferrous chloride is in particulate form and will not liquefy upon further cooling.

In the processing of ferrotitaniferous materials it is possible to circumvent the problem of ferrous chloride pluggage by utilizing ferrotitaniferous materials that contain so little iron, e.g., less than 10% by weight, calculated as $Fe_2O_3$, that the amount of iron chloride, even of the ferrous type, is not sufficient to cause major problems. Since ferrotitaniferous materials containing only small iron content are not always available or economic, a lower grade ferrotitaniferous material, e.g., consisting of more than 10% by weight of iron, calculated as $Fe_2O_3$, and commonly as high as 50% by weight of iron, calculated as $Fe_2O_3$, can be chlorinated using excess chlorine so that ferric chloride is the major iron chloride produced. Even though chlorinating to produce ferric chloride substantially eliminates pluggage of the apparatus, the economic penalty for needed excess chlorinating agent can be high. It follows that the more iron in the ferrotitaniferous material, the higher the cost of chlorinating to ferric. The invention provides for the efficient processing of ferrotitaniferous materials on a ferrous basis, i.e., wherein at least 85% by weight of the iron content of the ferrotitaniferous is chlorinated to ferrous state, without pluggage and without excess chlorinating agent.

A wide variety of conventional apparatus can be utilized in the practice of this invention. One embodiment is schematically shown in FIG. 1. In practice a metaliferous material, such as a ferrotitaniferous material, enters a chlorination furnace 1 through a material-inlet port 2. A chlorinating agent, such as chlorine gas, enters through gas port 3 and reacts with the metaliferous material in reaction zone 4. The gaseous mixture of metal chlorides frome the chlorination reaction then passes from reaction zone 4 to contact zone 5 where the gaseous mixture is contacted with a high velocity stream of liquid coolant 6. The liquid coolant is stored in a first storage tank 7 and delivered under pressure through nozzle 8 to contact zone 5. After contact with the high velocity stream of liquid coolant 6 in contact zone 5, at least one metal chloride is snowed-out as a particulate solid 9 which is pneumatically transported through transfer duct 10 with the remaining components of the gaseous mixture to spray condenser 11. If desired, the particulate solid 9 can be removed prior to entering the spray condenser 11 by installing a conventional gas-solid-gas separation device (not shown), such as a cyclone, at a position in transfer duct 10. Without removing particulate solid 9 the gaseous mixture and pneumatically transported particulate solid 9 enter spray condenser 11 by passing from inlet port 12 which is provided with ceramic insulation 13 to a circular vapor distributor 14 which is also insulated with ceramic insulation 13. The distributor 14 forms the gaseous mixture and solid 9 into a descending cylindrical curtain of vapor-solid mixture 15 which enters spray chamber 16. Liquid coolant is supplied to the spray condenser 11 from storage tank 17. The liquid coolant passes from the storage tank 17 through pipe 18 to impeller 19 situated on the axis of the cylindrical curtain of vapor-solid mixture 15. Upon contact with the impeller, driven by motor drive 20, the liquid coolant is dispersed throughout the vapor-solid mixture to further cool the mixture to solidify the remaining major metal chlorides in the gaseous mixture except one. The metal chloride remaining in the gaseous state exits the spray condenser through exit port 21. The solid metal chlorides are removed by a conveyor 22.

The following example illustrates the invention.

EXAMPLE

This example illustrates the practice of the invention using the gaseous mixture resulting from the chlorination of a ferrotitaniferous material wherein over 99% by weight of the iron component is chlorinated to ferrous chloride. The process is described for use in equipment such as depicted in FIG. 1.

A mixture of ilmenite containing approximately 62% by weight of $TiO_2$ and 32% by weight of iron, calculated as $Fe_2O_3$, is added to a chlorinator at a rate sufficient to continuously produce 343 cubic feet per second of effluent gas at 980° C. containing 100 pounds of ferrous chloride per 1 pound of ferric chloride. The effluent gas is passed from the chlorinator to a transfer duct where it is contacted with a countercurrent jet of liquid titanium tetrachloride flowing at a rate of 200 gallons per minute and the effluent gas is cooled to 460° C. in less than 1 second. The resulting particulate ferrous chloride is conveyed by the remaining cooled gas through the transfer duct to a conventional spray condenser as shown in FIG. 1 and further cooled to 210° C.

to condense the impurities such as ferrous chloride to the solid state while maintaining the titanium tetrachloride as a gas. The titanium tetrachloride is then removed from the spray condenser to be purified in further operations while maintaining the titanium tetrachloride as a gas. The titanium tetrachloride is then removed from the spray condenser to be purified in further operations while the solids consisting primarily of ferrous chloride are removed from the bottom of the spray condenser by a screw conveyer.

The above-described process is operated continuously for 7 days during which time no pressure drop is observed along the transfer duct, indicating no substantial buildup of material thereon. At the end of the continuous period of operation the insides of the apparatus are inspected and show no significant buildup of solids.

What is claimed is:

1. In a process for recovering metal chlorides from a gaseous mixture consisting essentially of at least two gaseous metal chlorides, the improvement comprising contacting the gaseous mixture flowing through a transfer duct at a temperature above the condensation point of the gaseous mixture with at least one stream of liquid to rapidly cool substantially all of the gaseous mixture to a temperature below the freezing point of at least one of the metal chlorides in the gaseous mixture, the velocity of the gaseous mixture being at least the pneumatic conveyance velocity at the contact zone and the rate of cooling substantially all of the gaseous mixture being less than one second.

2. Process for recovering metal chlorides from a gaseous mixture according to claim 1 wherein the gaseous metal chlorides are selected from the group consisting of the chlorides of titanium, iron, copper, lead, zinc, calcium, chromium, cobalt, nickel, tin, aluminum, vanadium, manganese, and magnesium.

3. Process for recovering metal chlorides from a gaseous mixture according to claim 2 wherein the velocity of the stream of liquid is sufficient to provide at least 1.0 jet horsepower per square foot of cross-sectional area of the contact zone.

4. Process for recovering metal chlorides from a gaseous mixture according to claim 3 wherein the stream of liquid is directed countercurrently to the direction of flow of the gaseous mixture.

5. Process for recovering metal chlorides from a gaseous mixture according to claim 4 wherein the velocity of the gaseous mixture is at least the flooding velocity at contact zone.

6. Process for recovering metal chlorides from a gaseous mixture according to claim 5 wherein the gaseous mixture consists essentially of titanium tetrachloride, ferric chloride, and ferrous chloride and the stream of liquid is selected from at least one of titanium tetrachloride, carbon tetrachloride, methylene chloride, and chlorine.

7. Process for recovering metal chlorides from a gaseous mixture according to claim 6 wherein the temperature of the gaseous mixture prior to contacting the stream of liquid is above the condensation point of ferrous chloride and wherein the gaseous mixture is cooled to a temperature of from 175° to 600° C.

* * * * *